United States Patent [19]

Toida

[11] 4,068,923
[45] Jan. 17, 1978

[54] ELECTRO-OPTICAL CELL

[75] Inventor: Takashi Toida, Chiba, Japan

[73] Assignee: Dai Nippon Insatsu Kabushiki Kaisha, Tokyo, Japan

[21] Appl. No.: 717,186

[22] Filed: Aug. 24, 1976

[30] Foreign Application Priority Data

Aug. 27, 1975 Japan .................................. 50-103671

[51] Int. Cl.² ................................................ G02F 1/13
[52] U.S. Cl. ............................. 350/160 LC; 252/299; 428/1
[58] Field of Search ...................... 350/160 LC; 428/1

[56] References Cited

U.S. PATENT DOCUMENTS

| | | | |
|---|---|---|---|
| 3,966,305 | 6/1976 | Young | 350/160 LC |
| 3,982,820 | 9/1976 | Hattori et al. | 350/160 LC |
| 3,994,567 | 11/1976 | Matsuo et al. | 350/160 LC |

Primary Examiner—Edward S. Bauer
Attorney, Agent, or Firm—Koda and Androlia

[57] ABSTRACT

An electro-optical cell for field-effect type liquid crystal display comprises:

a pair of electrode base plates each comprising a transparent base plate and an electrode film adhering to one surface thereof;

a pair of inorganic electrode-protecting layers respectively provided at least on the peripheral portion of the surface having the electrode film of each electrode base plate, said pair of electrode base plates being assembled with their surfaces having the electrode films facing each other by means of an inorganic sealing agent applied at the peripheral portions of the electrode base plates through the respective inorganic electrode-protecting layers so as to form a cell containing therein a nematic liquid crystal material having a positive dielectric anisotropy, and the cell being to be placed on an optical path so that light passes through the pair of the electrode base plates; and a pair of polyimide resin films respectively orientated in one direction and provided within the cell over each of the electrode films with or without the inorganic electrode-protecting layer interposed between the electrode film and the polyimide resin film so that the directions of the orientations of the polyimide resin films intersect each other as viewed along the optical path.

16 Claims, 2 Drawing Figures

ELECTRO-OPTICAL CELL

BACKGROUND OF THE INVENTION

The present invention relates to electro-optical cells. More specifically, it is concerned with an electro-optical cell for liquid crystal display of (electric) field effect twist nematic type (hereinafter referred to as FETN type) which is excellent in visibility angle, contrast, response, reliability and other characteristics.

A cell for liquid crystal display of FETN type can be basically obtained by interposing a nematic liquid crystal compound or composition having a positive dielectric anisotropy (when simply referred to as liquid crystal material hereinafter, it is intended to include both the compound and composition) between a pair of oriented transparent electrode base plates each comprising a transparent base plate and an electrode film provided thereon, and sealing the peripheral parts of the plates by any suitable means.

In a cell for liquid crystal display of FETN type, molecules of the liquid crystal material are initially aligned parallel to the electrode base plate by the influence of a pair of electrode base plates whose surfaces have been orientated thereby to impart optical rotatory power to the liquid crystal material. This alignment is controlled or realigned by the application of a suitable electric field thereby to vary the optical rotation through the liquid crystal material. By this variation in the optical rotation, electric signals are converted into optical information. By utilizing such mechanism, the FETN type cell can be used in displaying apparatuses.

Because of this operational principle, uniformity of the initial alignment of the liquid crystal (i.e. the alignment when no electric field is applied) or uniformity of the (surface) orientation of the electrode base plates giving the uniformity of the initial alignment of the liquid crystal is of primary importance in order that the cell for liquid crystal display of FETN type will function satisfactorily. Secondly, the seal structure of the cell must have excellent tight-sealing property and waterproofness in order to maintain the above-mentioned alignment and to prevent the liquid crystal material from deteriorating. Generally, a liquid crystal material is hydrolyzable or subject to some deterioration under the action of moisture even if it is not hydrolyzed, and at the same time the orientation itself is necessarily influenced by moisture.

Schiff-cyano base liquid crystal materials which have been widely used in recent years as a liquid crystal material having a positive dielectric anisotropy suitable for use in the cell for liquid crystal display of FETN type are particularly highly hydrolyzable. When the hydrolysis proceeds, the consumption of electric power is increased, and at the same time the nematic-isotropic transition temperature (NI point) of the liquid crystal material is decreased until it exhibits no liquid crystal phase. There are also other types of liquid crystal materials such as biphenyl liquid crystal materials which are not hydrolyzable and exhibit little decrease in the NI point even if they are subjected to high temperatures. When these materials are attacked by moisture, the consumption of electric power also increases, however, and the alignment of the liquid crystal material is consequently destroyed.

Therefore, in order to obtain an excellent electro-optical cell for liquid crystal display of FETN type, both the uniformity of the initial alignment of the liquid crystal and the soundness of the seal structure of the cell are essential factors. The present invention contemplates improving these two factors and providing an electro-optical cell for liquid crystal display of FETN type which has excellent optical characteristics such as visibility angle, contrast, response, and reliability.

As a measure known heretofore for obtaining uniformity of the initial alignment of a liquid crystal (i.e. a measure for orientating electrode base plates), there is a method wherein the electrode base plates are rubbed in one direction (orientated) by a material such as cloth, but by this method, resulting alignments of liquid crystal molecules differ locally, and the uniformity of orientation is not sufficient. Furthermore, the orientation is lost within a short time.

According to another method intended to solve the above described problems, a surface-active agent (surfactant) of a certain kind is additionally used, and the electrode base plates are rubbed in one direction (as disclosed, for example in IBM Technical Disclosure Bulletin Vol. 13, No. 11, Apr. 1971). While the uniformity of orientation is improved to a certain extent by this method, the surfactant does not possess sufficient heat resistance and, furthermore, gives rise to deterioration of the liquid crystal material. Then, when an electric field is applied, the surfactant decomposes because of the electric field and undergoes deterioration, and the orientation is destroyed.

On the other hand, there are known two types of seal structure; one type using an organic sealing agent as a sealing agent, and the other type using an inorganic sealing agent. Of these, an organic sealing agent is deficient in waterproofness and airtightness and cannot provide an electro-optical cell having high reliability as stated above. In this respect, an inorganic sealing agent is preferable. However, the inorganic sealing agent widely used in the electronic components field is generally a low melting point glass frit whose melting and processing temperature is above 350° C. Therefore, where such a sealing agent is used for sealing the cell, orientation capable of withstanding such a high temperature is necessary, and it is further necessary to protect the electrode film without damaging the seal properties of the sealed parts. Although some glass frits may be fused at a temperature below 350° C, they are inferior in bonding strength, and the portions bonded thereby may be destroyed by heat impact.

Accordingly, in order to provide an electro-optical cell for liquid crystal display with high reliability which has excellent tightness, bonding strength, and heat impact resistance, orientation treatment which results in an orientation resistant to a temperature of at least 350° C, and preferably no less than 400° C is required. The orientation treatment comprising rubbing the electrode base plate simply or using a certain type of surfactant as referred to before cannot fully produce a heat resistant orientation.

At the present stage, as an orientation method which impacts a high heat resistance, i.e. a reliable orientation such that the inorganic sealing agent can be used, an inclined evaporation orientation method known (as disclosed, for example, in Applied Physics Letter, 173 21. 4, 1972). According to the inclined evaporation orientation method wherein the electrode base plates are inclined relative to an evaporation deposition source of an inorganic material such as silicon monoxide, and the material is deposited by evaporation thereby to accomplish orientation, the orientation agent itself is certainly heat resistant. However, the resulting orientation is relatively poor in heat resistance and the orientation power is low so that the molecules of the liquid crystal are not completely aligned horizontally to the electrode base plate. For this reason, a liquid crystal apparatus using the cell so obtained is inferior in contrast and visibility angle.

On the other hand, the orientation is gradually varied when an electric field is applied for a prolonged period of time, and even when no electric field is applied, parts of the surface provided with the electrode film and the remaining parts of the surface provided with no electrode film of the electrode base plate differ in orientation direction from each other.

That is, in the present state of the art, an electro-optical cell for liquid crystal display of FETN type having excellent uniformity of the initial alignment of the liquid crystal in combination with high reliability of seal structure has not yet been realized in practice.

In order to overcome the above described various difficulties accompanying the known electro-optical cells of FETN type and to provide an electro-optical cell of FETN type possessing both excellent display performance and high reliability, we have carried out studies with the realization that the construction of the cell and the selection of material must be collectively examined in relation to the production method including the sealing method. As a result, we have attained the present invention.

SUMMARY OF THE INVENTION

In accordance with the present invention, there is provided an electro-optical cell for field effect type liquid crystal display comprising, a pair of electrode base plates each comprising a transparent base plate and an electrode film adhering to one surface thereof;

a pair of inorganic electrode-protecting layers respectively provided at least on the peripheral portion of the surface having the electrode film of each electrode base plate, said pair of electrode base plates being assembled with their surfaces having the electrode films facing each other by means of an inorganic sealing agent applied at the peripheral portions of the electrode base plate through the respective inorganic electrode-protecting layers so as to form a cell containing therein a nematic liquid crystal material having a positive dielectric anisotropy, and the cell being to be placed on an optical path so that light passes through the pair of the electrode base plates; and a pair of polyimide resin films respectively orientated in one direction and provided within the cell over each of the electrode films with or without the inorganic electrode-protecting layer interposed between the electrode film and the polyimide resin film so that the directions of the orientations of the polyimide resin films intersect each other as viewed along the optical path.

As a result of the above described construction, the electro-optical cell of the present invention has excellent characteristics as set forth below.

1. As a result of the provision of the orientated polyimide resin film imparting a uniform initial alignment, the electro-optical cell of the present invention has excellent optical characteristics such as visibility angle, contrast, and response.

2. Because the orientated polyimide resin film is heat resistant with respect to both the material nature and the maintenance of the orientation, a sealing method using an inorganic sealing agent with a high reliability is applicable to the electro-optical cell of the present invention, and the resultant sealed portions are excellent in airtightness, waterproofness, and heat impact resistance, and, thus, the electro-optical cell of the present invention possesses high reliability over a long period of use.

3. As a result of the provision of the inorganic electrode-protecting layer, the electrode film is not damaged even under a high temperature sealing operation with the use of the inorganic sealing agent. Further, because of the same nature of the materials of which the protective layer and the sealing agent are composed, an excellent and integrated seal is obtained.

Accordingly, it can be stated that the electro-optical cell of the present invention constructed by taking the production method into consideration as well is particularly excellent in displaying performance and reliability.

The nature, utility, and further features of the invention will be apparent from the following detailed description, beginning with a consideration of general aspects of the invention and concluding with specific examples of practice illustrating preferred embodiments of the invention, when read in conjunction with the accompanying drawing.

DETAILED DESCRIPTION

Figure 1:
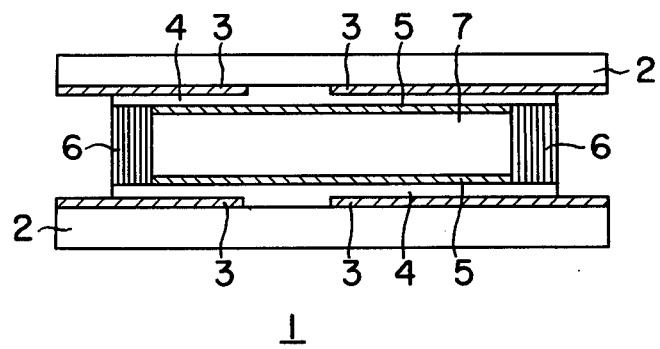
FIG. 1 is a diagrammatic longitudinal section showng an example of the assembled structure of the electro-optical cell according to the invention.

Referring first to FIG. 1, the electro-optical cell 1 of the invention, comprising, basically, a pair of electrode base plates, (2+3), each comprising a transparent base plate 2 and an electrode film 3 adhering thereto assembled with their surfaces having the electrode films facing each other by means of an inorganic sealing agent 6 applied at the peripheral portion (sealing part) of the electrode base plates so as to form a cell containing a liquid crystal material having a positive dielectric anisotropy 7. An inorganic electrode-protecting layer 4 is disposed entirely on each of the electrode films 3, and the pair of electrode base plates are assembled with the inorganic sealing agent through the respective electrode-protecting layers 4. A pair of polyimide resin films 5 are respectively provided on the electrode-protecting layers 4 within the areas defined by the peripherally provided inorganic sealing agent, thus, within the cell. The polyimide resin films are respectively orientated in one direction, and so disposed on the electrode-protecting layers that their orientated directions intersect each other as viewed along the optical path. Thus, the liquid crystal material 7 is sandwiched between and in contact with the pair of polyimide resin films 5, and aligned by the orientation of the polyimide resin films when no electric field is applied thereto.

Figure 2:
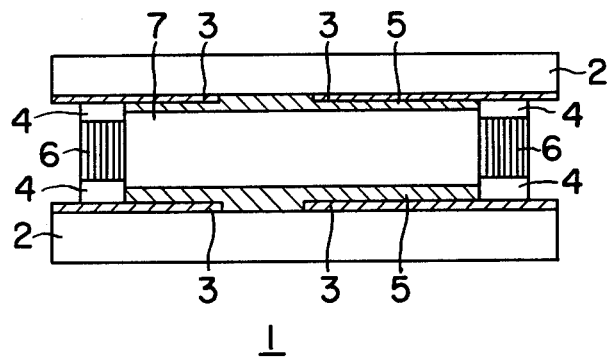
FIG. 2 is a diagrammatic longitudinal section showing another example of the assembled structure of the electro-optical cell of the invention.

FIG. 2 shows another example of the cell of the invention. In the assembled structure shown in FIG. 2, the electrode protecting layer 4 is provided only on the sealing parts, and the orientated polyimice resin films 5 are directly disposed on the surface of the electrode base plate having the electrode film 3.

It is necessary that the above mentioned two base plates 2 constituting construction components for the electrode plates have electrical insulating property, be transparent, and be capable of withstanding a high temperature during the sealing operation. Ordinarily, glass is a suitable material for this purpose.

On the inner surface of each of these plates, a transparent electrode film 3 is formed by an ordinary process. For example, a transparent electro-conductive film such as a film composed principally of tin oxide, indium oxide, or the like can be formed by a process such as a spraying process or a vacuum evaporation deposition process. Each of these electrode films is worked by a process such as photo-etching to impart thereto a specific pattern such as, for example, one or more numerals or characters or a pictorial pattern. In this manner, a pair of electrode base plates are formed.

Next, it is necessary that the inorganic electrode-protecting layer disposed on the entire surface (as shown in FIG. 1) or at least a sealing part (as shown in FIG. 2) of the surface provided with the electrode film of the electrode base plate be capable of withstanding a high temperature during the sealing operation, have high adhesiveness to the glass of the electrode plate, and be made of an insulating inorganic vitreous material into which the glass components of a sealing agent glass frit can deffuse. The material is usually transparent but, in the case where the protecting layer is formed only on the sealing part, it is not necessarily be absolutely transparent. Examples of inorganic materials satisfying the above requirements include vitreous materials such as silicon dioxide ($SiO_2$), silicon monoxide (SiO), magnesium fluoride ($MgF_2$), aluminum oxide ($Al_2O_3$), lithium-silicon double oxide (LiO — SiO), and mixtures and mixed oxides of the above materials.

The electrode-protecting layer may be formed by various methods. For example, a layer of an insulating metal compound such as $SiO_2$, SiO and $MgF_2$ can be formed by a vacuum evaporation deposition process, or a method of coating and heating vitrifiable inorganic film-forming composition such as a colloidal solution of lithium-silica, or an organic material such as glass resin which can be converted into an organic material by heat-curing may be used.

One preferred example of a coating composition for providing the electrode-protecting of a vitreous material is a siliceous composition which comprises a solution of silicon compound, a vitrifiable compound, and, desirably, an organic film-forming agent.

The silicon-compound is, for example, silicon tetrahydroxide or partially dehydrated oxides thereof or a mixture thereof, which is prepared by reacting a silane halide with a carboxylic acid and, further, reacting the resultant product with an alcohol.

Examples of the silane halide are tetrachlorosilane, monomethyltrichlorosilane, dimethyldichlorosilane, monoethyltrichlorosilane, diethyldichlorosilane, monophenyltrichlorosilane, and mixtures thereof. Examples of the carboxylic acid are acetic acid, acetic anhydride, propionic acid, butyric acid, and mixtures thereof. Examples of the alcohol are methyl alcohol, ethyl alcohol, propyl alcohol and butyl alcohol. Examples of the vitrifiable compound are phosphorus pentoxide, boric anhydride, orthoarsenic acid, antimony trichloride, zinc acetate, and ammonium acetate which are soluble in the above-stated silicon compound solution, and mixtures thereof.

As the organic film-forming agent, an organic high polymer compound which is soluble in the above-stated silicon compound solution and can be easily decomposed and evaporated off by heat, such as polyvinyl acetal, polyvinyl butyral, polyvinyl ether and ethyl cellulose can be used.

In the siliceous composition, it is preferable that the silicon compound has a concentration of 5 to 20% by weight, the organic film-forming agent a concentration of 5 to 10% by weight of the composition, and the vitrifiable compound a concentration of 1 to 10% by weight of the silicon compound. Such a siliceous composition includes various grades of O. C. D. (Ohka, Coat Diffusion-Source) manufactured by Tokyo Ohka Kogyo-Sha. This composition is coated at least on the sealing parts of the surface including the electrode film of the electrode base plate by any conventional method such as brush painting, dipping, spin coating or spraying, and after drying, the coating is heated at a temperature of 250° to 700° C to form an electrode-protecting layer.

The electrode-protecting layer serves to prevent breakage of the electrode film during the operation of bonding the inorganic sealing agent to the electrode plate. That is, in order to obtain a seal strength and tight sealing performance in the sealing operation, the inorganic sealing agent must be sufficiently diffused into the material to be bonded. Thus, a high temperature of not less than 350° C is ordinarily used in the fusion and bonding operation. In this case, the sealing agent diffuses into the electrode film to increase the resistance thereof and finally render it electrically nonconductive. Therefore, the electrode protecting layer is essential for obtaining an excellent seal structure while preventing breakage of the electrode film. Although the electrode protecting layer need only be disposed at least on the sealing parts of the electrode base plate, it is preferable that the layer be disposed on the entire surface of the electrode base plate with which the liquid crystal contacts (as shown in FIG. 1) in order to prevent the injection of electric charge from the electrode film and the deterioration of the oriented resin and liquid crystal.

The thickness of the electrode-protecting layer is controlled to be from 0.005 to 10 microns, preferably from 0.05 to 3 microns. We have found that a layer thickness less than 0.005 micron is not capable of preventing breakage of the electrode film during the sealing operation, while a layer thickness greater than 10 microns results in poor bonding strength and in inferior electrical response.

Next, in accordance with this invention, a polyimide resin film is formed almost entirely on the part surrounded by the sealing parts of the inner surface of the electrode base plate and over the electrode film with or without the electrode protecting layer interposed between the surface having the electrode film of the electrode base plate and the resin film. (In the case where the electrode protecting layer is formed only on the sealing parts of the electrode base plate, the electrode protecting layer is not interposed.) After this operation, the polyimide resin film is subjected to an orientation process.

The term "polyimide resin" as herein used is intended to mean any polymer containing recurring imide bonds in the main chain thereof and includes polyimides containing recurring imide bonds, polyamide-imides containing recurring amide bonds and imide bonds, and polyester-imides containing recurring ester bonds and imide bonds.

Polyimide resins as defined above are constituted by polymers having imide bonds and, in general, are insoluble in solvents. For this reason, it is preferable, in order to form the polyimide resin film on an electrode base plate in this invention, to resort to the process of dissolving polyamic acid, which is a precursor of any one of the above-mentioned polymers constituting the polyimide resins, in a solvent described hereinafter, applying the resulting solution as a coating on the electrode base plate, and thereafter heat treating the film thereby to cause dehydration and ring closure of the polyamic acid and cause the film to acquire imide bonds.

For example, a polyamic acid can be coated on the electrode base plate by dissolving the polyamic acid in a solvent such as dimethylformamide, dimethylacetamide, dimethylsulfoxide, and N-methylpyrrolidene to form a solution of from 0.01 – 40 percent by weight concentration and applying this solution by a method such as brush painting, dipping, spin coating, or spraying. After coating, the coating film is heat treated and dried at a temperature of from 100 to 350° C, preferably from 200° to 300° C thereby to form a polyimide resin film on the electrode base plate. The electrode base plate already covered with the inorganic electrode-protecting layer can be coated with a polyimide resin film utterly in the same manner as described above.

The orientation treatment of this polyimide resin film can be carried out by a method such as, for example, by rubbing in a constant direction by means of a material such as a cloth or a brush.

The thickness of this polyimide resin film is controlled to be from 0.01 to 10 microns, preferably from 0.1 to 2 microns. We have found that a film thickness less than 0.01 micron results in weak orientation power and in poor contrast, while a film thickness greater than 10 microns results in difficulty in producing a uniform coating and in coloration characteristic of the polyimide resin.

Polyamic acids as a precusor of the above mentioned polyimide resins are respectively obtained by the following manners.

A polyamic acid as a procusor of the above mentioned polyimides, in their narrower sense, is synthesized by polyaddition of a carboxylic acid dianhydride and a diamine.

A polyamic acid as a precursor of the above mentioned polyamide-imides is synthesized by polyaddition of a carboxylic acid anhydride and a diamine having an amide bond which is obtained from, for example, an excessive diamine and a tricarboxylic acid anhydride such as trimellitic anhydride.

A polyamic acid as a precursor of the above mentioned polyester-imides is synthesized by polyaddition of a carboxylic acid dianhydride having an ester group and a diamine. The above mentioned carboxylic acid dianhydride having an ester group is obtained from, for example, a tricarboxylic acid such as trimellitic acid and one of various diols.

These polyaddition reactions are carried out under ordinary conditions, that is, under an anhydrous condition and a temperature of 50° C or less.

Examples of the above mentioned diamine are: m-pnehylenediamine, p-phenylenediamine, m-xylenediamine, p-xylenediamine, 4,4'-diaminodiphenylether, 4,4'-diaminodiphenylmethane, 3,3'-dimethyl-4,4'-diaminodiphenylmethane, 3,3',5,5'-tetramethyl-4,4'-diaminodiphenylmethane, 2,2'-bis (4-aminophenyl) propane-4,4'-methylenedianiline, benzidine, 4,4'-diaminodiphenylsulfide, 4,4'-diaminodiphenyl sulfone, 1,5-diaminonaphthalane, 3,3'-dimethylbenzidine, 3,3'-dimethaxybenzidine, 2,4-bis ($\beta$-amino-tert-butyl) toluene, bis(4-$\beta$-amino-tert-butylphenyl) ether, and 1,4-bis (2-methyl-4-aminopentyl) benzene.

Examples of the above mentioned diol are: hydroquinone, bisphenol A, dichlorobisphenol A, tetrachlorobisphenol A, tetrabromobisphenol A, bisphenol F, bisphenol ACP, bisphenol L, bisphenol V, bisphenol S, and 4,4'-dihydroxydiphenyl ether.

Examples of the above mentioned carboxylic acid dianhydride are: pyromellitic anhydride, 2,3,6,7-naphthalenetetracarboxylic anhydride, 3,3',4,4'-diphenyltetracarboxylic anhydride, 1,2,5,6-naphthalenetetracarboxylic anhydride, 2,2',3,3'-diphenyltetracarboxylic anhydride, thiophene-2,3,4,5-tetracarboxylic anhydride, 2,2-bis (3,4-biscarboxyphenyl) propane anhydride, perylene-3,4,9,10-tetracarboxylic anhydride, bis(3,4-dicarboxyphenyl ether anhydride, and 3,3',4,4'-benzophenonetetracarboxylic anhydride.

For the above specified diamines, diols, and carboxylic dianhydrides, aromatic compounds are preferable in all cases on the point of heat resistance.

The inorganic sealing agent is disposed on the part to be sealed of each or either one electrode-protecting layer formed on the electrode base plate.

The inorganic sealing agent is of a vitreous material when it is incorporated in the structure of the electrooptical cell. Thus, inorganic sealing agents usable for this invention also are vitrifiable materials, preferably glass frits having low melting points, which may be amorphous or crystalline. The preferred low-melting point glass frits are those which are capable of being heatsealed at low temperatures of not greater than 500° C, particularly 350° to 470° C. In the case where a crystalline glass frit is used, it is preferable that the frit have almost the same coefficient of heat expansion as that of the body to be sealed.

Ordinarily, the above mentioned glass frit is applied onto the parts to be sealed of the electrode protecting layer from a dispersion of the glass frit in an ordinary organic binder by a screen printing method. The organic binder may be prepared, for example, by dissolving ethyl cellulose or nitrocellulose in a solvent such as butylcarbitol and amyl acetate. The organic binder is used in a quantity of 0.1 to 10 parts by weight with respect to 10 parts by weight of the frit.

Although the organic binder so used may be decomposed off simultaneously with the sealing process wherein the two electrode base plates disposed with their opposite inner side facing each other are sealed and fixed by using a high temperature, it is preferable that the binder be previously removed by heating the sealing agent to any suitable temperature depending on the performance of the sealing agent prior to the sealing process.

In the above described manner, the pair of electrode base plates provided with inorganic electrode-protecting layers, orientated polyimide resin films and inorganic sealing agents are so disposed that their respective polyimide resin films are on their inner sides and face each other with their orientated directions in mutually intersecting state.

The resulting laminate structure is heated at a temperature of from 350° to 500° C, preferably from 400° to 470° C to fuse the parts to be sealed. On heating, the inorganic sealing agent is molten, and, on cooling, the pair of the electrode plates are sealed and fixed at the sealing parts between the electrode protecting layers by means of the inorganic sealing agent. It is preferable that the intersecting angle of the orientation direction be almost 90° on the points of contrast, response and visibility angle.

In this manner, a liquid crystal container is constructed.

With regard to the processes of preparing the sections of the liquid crystal container, as discussed in the above illustrations of the respective sections, the order of combining these respective processes is not critical provided that the electrode base plates are first provided. Therefore, by selecting a more suitable combination order, it is possible to obtain a more preferable liquid crystal container, thus, electro-optical cell.

By way of an example of a combination of the liquid crystal container preparation processes, the inorganic electrode protecting layer is disposed at least on the parts to be sealed of the surface having the electrode film of the electrode base plate, and the polyimide resin film is then formed on the surface in contact with the liquid crystal material other than the parts to be sealed. After subjecting the polyimide resin film to the orientation treatment, the inorganic sealing agent is applied to the parts to be sealed. Thereafter, the pair of the resulting electrode base plates are so disposed that their respective polyimide resin films are on their inner sides, and that they face each other, whereupon the electrode plates are sealed and fixed. As mentioned above, the sealing agent may also be omitted at one of the two electrode plates in this case.

As another example of the process combination, in the case where the inorganic layer for protecting the electrode is formed only on the parts to be sealed, the polyimide resin film is formed on the parts other than the parts to be sealed, after which the inorganic layer for protecting the electrode may be formed.

As still another example of the process combination, in the case where the organic binder used in the application of the inorganic sealing agent is removed by heat prior to the sealing and fixation of the electrode plates, the polyimide resin film may also be formed after the removal of the organic binder, i.e., immediately before the sealing and fixation. In this case, the sealing agent may also be omitted at one of the two electrode base plates.

In all of the examples of the process combination described above, when the pair of the electrode plates to which the inorganic sealing agent is respectively caused to strongly adhere by diffusing the sealing agent into the electrode protecting layers with preheating prior to the sealing are used, the period required for the heat pressure sealing and fixation of the pair of the electrode base plates can be shortened, which is advantageous in the preservation of the orientation power of the polyimide resin films.

As mentioned above, at the stage before the sealing and fixation of the electrode plates, a method wherein the sealing agent is disposed on only one plate of the two electrode base plates or a method wherein the sealing agent is disposed on the both plates of the pair of the electrode base plates may be used. In the latter case, the following method may also be carried out. That is, the sealing agent is applied to a portion of the parts to be sealed of one plate of the two electrode base plates, and for the other plate, the sealing agent is applied to the portion of the parts to be sealed other than that corresponding to the portion with the sealing agent applied thereto of the first plate.

The liquid crystal container thus assembled is provided with a pouring port for the liquid crystal material at any point of the electrode base plates or the sealing parts at any suitable stage of the production process.

Then, a liquid crystal material having a positive dielectric anisotropy is poured into the liquid crystal container so assembled through the pouring port. Thereafter, the pouring port is sealed by a low temperature sealing agent including low melting point metals or inorganic, preferably vitrifiable, compounds or an organic material such as an epoxy resin, polyamide resin, polyurethane resin, acrylic aresin, α-polyolefin resin, any of various waxes, or a polyester resin, whereupon the electro-optical cell of this invention is obtained. The sealing agent should preferably has a melting temperature below 250° C.

The above mentioned liquid crystal material may be a single compound or a composition. A single compound or a composition which, as a whole, has a positive dielectric anisotropy (that is, a characteristic wherein the dielectric constant along the direction of the major axis of the molecules is greater than the dielectric constant in the direction perpendicular to the direction of the major axis of the molecules) is used. For this nematic liquid crystal composition, a composition comprising a mixture of nematic liquid crystal compounds having positive dielectric anisotropy (herein referred to as Np liquid crystal compounds) or a composition comprising at least one member of Np liquid crystal compounds and at least one of nematic liquid crystal compounds having negative dielectric anisotropy (herein referred to as Nn liquid crystal compounds) and, as a whole, exhibiting positive dielectric anisotropy is used. In this connection, a liquid crystal material of a composition comprising two or more constituents gives a wide range of operational temperature of the display element and is therefore desirable.

Examples of Np liquid crystal compounds suitable for use as set forth above are, for example, as follows.

Anils p-alkoxybenzylidene-p'-cyanoaniline represented by the general formula

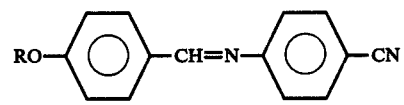

(R: $n$—$C_mH_{2m+1}$, $m=1$ to 8);
p-alkylcarboxybenzylidene-p'-cyanoaniline represented by the general formula

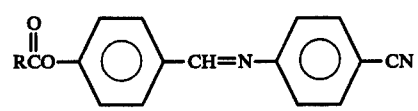

(R: $n$—$C_mH_{2m+1}$, $m=1$ to 6);
p-alkylbenzylidene-p'-cyanoaniline represented by the general formula

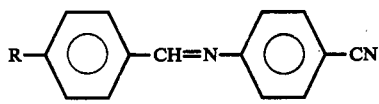

(R: $n-C_mH_{2m+1}$, $m=3$ to 6);
p-cyanobenzylidene-p-'-alkoxyaniline represented by the general formula

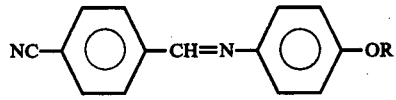

(R: $n-C_mH_{2m+1}$, $m=1$ to 8);
p-cyanobenzylidene-p'-alkylaniline represented by the general formula

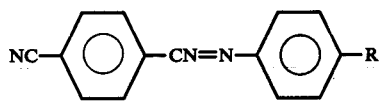

(R: $n-C_mH_{2m+1}$, $m=3$ to 6); and
p-alkoxybenzylidene-p'-alkylaniline represented by the general formula

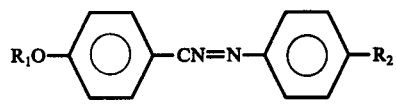

($R_1$: $C_mH_{2m+1}$, $m=1$ to 6, $R_2$: $C_{m'}H_{2m'+1}$, $m'=3$ to 7);

Biphenyls p-alkyl-, p-alkoxy-, p-(p-alkylphenyl)-, p-(p-alkoxyphenyl)- or p-benzoxy-p'-cyanobiphenyl represented by the general formula

(A: $C_mH_{2m+1}$, $OC_mH_{2m+1}$, 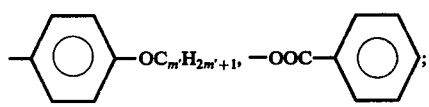

$m=5$ to 15, $m'=2$ to 24);

Azoxybenzenes p-alkyl-p'-alkylazoxybenzene represented by the general formula

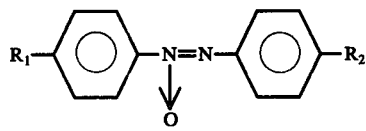

($R_1R_2$: $n-C_mH_{2m+1}$, $m=4$ to 7);

Benzoates p-cyanophenyl-p'-n-alkylbenzoate represented by the general formula

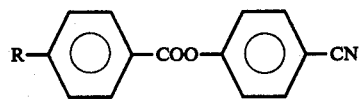

(R: $C_mH_{2m+1}$, $m=3$ to 8);
p-cyanophenyl-p'-alkoxybenzoate represented by the general formula

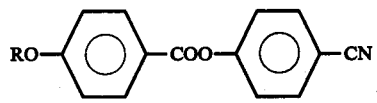

(R: $C_mH_{2m+1}$, $m=4$ to 7);
p-alkoxyphenyl-p'-cyanobenzoate represented by the general formula

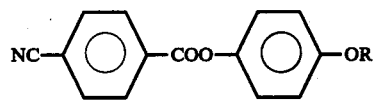

(R: $C_mH_{2m+1}$, $m=4$ to 7); and
p-alkylphenyl-p'-cyanobenzoate represented by the general formula

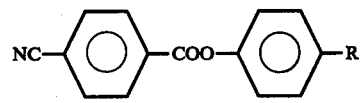

(R: $C_mH_{2m+1}$, $m=4$ to 8); and

Azo-compound p-cyano-p'-alkoxyazobenzene represented by the general formula

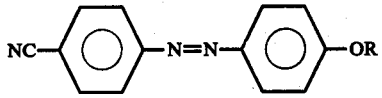

(R: $C_mH_{2m+1}$, $m=4$ to 7).

Examples of Nn liquid crystal compounds are p-methoxybenzylidene-p'-n-butylaniline and p-ethoxybenzylidene-p'-n-butylaniline. These compounds are used in a liquid crystal composition having a positive dielectric anisotropy as a whole by adding thereto at least one Np liquid crystal compound which exhibits a great positive dielectric anisotropy.

The uniformity of the initial alignment of this nematic liquid crystal material having a positive dielectric anisotropy can be further improved by adding thereto an optically active compound such as a cholesteryl compound, or a biphenyl derivative, phenylbenzoate derivative, benzylideneaniline derivative, or azoxybenzene derivative having an optically active substituent in a quantity of from 0.01 to 5 percent by weight with respect to the nematic liquid crystal material.

The electro-optical cell of this invention as described above can be effectively used in combination with a polarizer such as a linear polarizing plate or a circular polarizing plate, a reflecting plate, and the like to constitute a liquid-crystal displaying device of field effect twist type and thereby advantageously applied to a wide variety of displaying apparatuses such as electronic desk-top calculators, various time pieces, and counter display panels.

In order to indicate more fully the nature and utility of this invention, the following examples of practice constituting preferred embodiments of this invention together with comparison examples are set forth, it being understood that these examples are presented as illustrative only and that they are not intended to limit the scope of the invention. Throughout these examples and comparison examples, quantities expressed in "parts" are parts by weight.

EXAMPLE 1

Pieces of glass for electrode base plates with electroconductive films of tin oxide deposited by evaporation on their surfaces on one side were etched with specific patterns and then washed by an ordinary method thereby to produce two pairs of electrode base plates. A film of silicon monoxide having a thickness of 0.2 micron was deposited by evaporation on the surfaces having the conductive film of the electrode base plates to form an inorganic material layer for protecting the electrode films thereon. Then, a 1% solution in N-methylpyrrolidone of a polyamic acid which is a precursor of a polyimide, and which was obtained by polyaddition of pyromellitic anhydride and 4,4'-diaminodiphenyl ether, was applied as a coating onto the electrode protecting layers except for the sealing parts by spin coating. After this coating, these electrode base plates were heat treated at 250° C for 30 minutes and caused to undergo dehydration and ring closure, and a polyimide film was thus formed on each electrode base plate.

Then each of these electrode base plates provided with the polyimide film was orientated by rubbing in one direction with a cloth. Thereafter, 10 parts by weight of glass frit having a softening point of 380° C and 3 parts by weight of a 3% solution of ethyl cellulose in butylcarbitol were mixed together to form an ink composition, and the ink composition was printed on the sealing parts of the electrode base plates by a silk-screen printing method. The resulting electrode base plates were dried at 200° C for 10 minutes.

Then the pair of these plates thus treated were bonded with their surfaces coated with the polyimide film on the inner sides and facing each other and with their respective orientated directions at right angles to each other by heat-pressure bonding at 450° C for 10 minutes.

Thereafter, into the spaces between the two pairs of plates through respective previously provided pouring ports, a mixture liquid crystal material (A) composed of 50 parts of p-methoxybenzylidene-p'-n-butylaniline, 50 parts of p-ethoxybenzylidene-p'-n-butylaniline, 60 parts of p-n-propoxybenzylidene-p'-cyanoaniline and 5 parts of p-n-amylbenzylidene-p'-cyanoaniline, and a mixture liquid crystal material (B) prepared by adding 0.02 gram g of (+) p-isoamyloxy-p'-cyanobiphenyl to 10 g of the above mentioned mixture (A) were respectively introduced, and the pouring parts of the two pairs of plates were sealed with an epoxy resin. Thus, electro-optical cells 2 and 2 of the invention were fabricated.

Then, on the opposite surfaces of each of these two electro-optical cells, linear polarizing plates were respectively disposed with the polarization direction of each parallel to the orientation direction of the adjacent electrode base plate thereby to assemble a display device.

In each of these display devices, the electro-optical cell of this invention was found to exhibit characteristics such as uniform contrast and wide angle of visibility. Furthermore, when each of these devices was left for 1,000 hours under a temperature of 50° C and a high relative humidity of 90%, neither destruction of orientation nor change in a temperature range of a liquid crystal phase was observable. Thus, the excellent reliability of these devices was demonstrated. Further, a display device of reflective type was assembled by positioning a reflector plate on the outer side of one of the polarizing plates of each of the above mentioned display devices. The two display devices thus assembled also exhibited excellent characteristics.

EXAMPLE 2

Pieces of glass for electrode base plates with electroconductive films of indium oxide deposited by evaporation on their surfaces on one side were etched with specific patterns and then washed by an ordinary method thereby to produce two pairs of electrode base plates. A film of magnesium fluoride having a thickness of 0.5 micron was deposited by evaporation on the surfaces having the electroconductive film of the electrode base plates to form an electrode protecting layer thereon. Thereafter, according to the procedure described in Example 1, electro-optical cells of the invention were produced. Then, in the same manner as described in Example 1, display devices were assembled using these cells. These display devices also exhibited excellent characteristics similarly as in Example 1.

EXAMPLE 3

Pieces of glass for electrode base plates with electroconductive films of indium oxide deposited by evaporation on their surfaces on one side were etched with specific patterns and then washed by an ordinary method thereby to produce a pair of electrode base plates. A 2% aqueous solution of silicic acid anhydride/lithium oxide (in a mole ratio of 4) was applied onto the surfaces having the electroconductive film of the electrode base plates by spin coating and dried by heating at 100° C for 24 hours to form an electrode protecting layer. Thereafter, 10 parts by weight of glass frit having a softening point of 370° C and 2 parts by weight of a 3% solution of ethyl cellulose in butylcarbitol were mixed together to form an ink composition, which was then printed on the sealing parts of th electrode protecting layer by a silk-screen printing method. Then, the electrode base plates were heated at a temperature of 300° to 500° C for 1 hour to remove the organic materials from the applied ink composition.

Next, a 0.5% solution in dimethylacetone of a polyamic acid which is a precursor of a polyimide, and which was obtained by polyaddition of pyromellitic anhydride and 4,4'-diaminodiphenylmethane, was applied onto the electrode protecting layers except for the sealing parts by spin coating. After this coating, these electrode base plates were heat treated at 250° C for 30 minutes and caused to undergo dehydration and ring closure, and a polyimide film was thus formed on each of the electrode protecting layers except for the sealing parts.

Then, each of these electrode base plates provided with the polyimide film was orientated by rubbing in one direction with a cloth. Thereafter, the pair of these plates thus treated were bonded with their surface coated with polyimide film on the inner sides and facing each other and with their respective orientated directions at right angles to each other by heat-pressure bending at 460° C for 10 minutes.

Thereafter, into the spaces between the pair of plates through a previously provided pouring port, a mixture liquid crystal material composed of 40 parts of p-methoxy-benzylidene-p'-n-butylaniline, 60 parts of p-ethoxybenzylidene-p'-n-butylaniline, 20 parts of n-butoxyphenyl-p'-cyanobenzoate, 10 parts of p-n-amyloxyphenyl-p'-cyanobenzoate and 5 parts of n-propylbenzylidene-p'-cyanoaniline was introduced, and the pouring port of the pair of plates was sealed with an epoxy resin. In this manner, an electro-optical cell of the invention was fabricated.

Then, in the same manner as described in Example 1, a display device was fabricated using the above cell. The display device also exhibited excellent characteristics similarly as in Example 1.

EXAMPLE 4

Pieces of glass for electrode base plates with electro-conductive films of indium oxide deposited by evaporation on their surfaces on one side were etched with specific patterns and then washed by an ordinary method thereby to produce a pair of electrode base plates. A 5% solution in ethyl alcohol of glass resin HW-25 manufactured by Howa Denki K.K., Japan was coated only on the sealing parts of the electrode base plates. The coating was then hardened by heating at 100° C for 24 hours to form an electrode protecting layer. Thereafter, according to the procedure described in Example 3, an electro-optical cell of this invention was fabricated.

Then, similarly as in Example 1, a display device was fabricated with the electro-optical cell, whereupon it was found that the cell of this invention exhibited excellent characteristics similarly as in Example 1.

EXAMPLE 5

Magnesium fluoride (MgF) was deposited by evaporation on the surfaces having the electroconductive films of a pair of electrode base plates to form an electrode protecting layer.

Thereafter, glass frit having a softening point of 370° C was mixed with an organic binder consisting of a 2.5% solution of ethyl cellulose in butylcarbitol to form an ink composition, and the ink composition was printed on the sealing parts of the electrode protecting layer by a silk-screen printing method. Next, the electrode base plates were heated at a temperature of 300° to 500° C to remove the organic materials from the applied ink composition thereby to bake the glass frit onto the sealing parts of the electrode protecting layer.

Then, a 3% solution in dimethylacetamide of a polyamic acid which is precursor of a polyimide, and which was obtained by polyaddition of pyromellitic anhydride and 3,3'-diamino-benzanilide, was applied onto the electrode protecting layers except for the sealing parts by spin coating. After this coating, these electrode base plates were heat treated at 200° C for an hour and caused to undergo dehydration and ring closure, and a polyimide film was thus formed on each electrode base plate.

Then each of these electrode base plates provided with the polyimide film was orientated by rubbing in one direction with a cloth. The pair of these plates thus treated were bonded with their surfaces coated with the polyimide film on the inner sides and facing each other and with their respective orientated directions at right angles to each other by heat-pressure bonding at 410° C for 5 minutes.

Thereafter, into the space between the pair of plates through a previously provided pouring port, a mixture liquid crystal material composed of 10 parts of p-n-hexylbenzylidene-p'-cyanoaniline and 40 parts of p-n-propylbenzylidene-p'-cyanoaniline was introduced, and the pouring port was sealed with a silicone resin. Thus, an electro-optical cell of the invention was completed.

When the cell was left for 1,000 hours under a temperature of 50° C and a high relative humidity of 90%, destruction of orientation, reduction in NI point, and increase in the consumption of electric power were not observable. Thus, the excellent characteristics of the cell were demonstrated.

EXAMPLE 6

An electro-optical cell was fabricated according to the same procedure as described in Example 5 except that, instead of the use of the polyamide-imide film, a solution of a polyamic acid which is a precursor of polyesterimide, and which was obtained by polyaddition of 4,4'-diaminodiphenylether and an aromatic carboxylic acid dianhydride obtained from hydroquinone and trimellitic anhydride was applied onto the electrode base plates, and these electrode base plates were heated and caused to undergo dehydration and ring closure thereby to form a polyester-imide film.

The resultant cell exhibited excellent characteristics similarly as in Example 5.

EXAMPLE 7

Two electro-optical cells were fabricated according to the same procedure as described in Example 1 except that an electrode protecting layer of silica type having a thickness of 0.5 micron instead of the silicon monoxide film was formed on the overall surface provided with the electrode films of the electrode base plates as an inorganic material layer for protecting the electrode, the silica type electrode protecting layer being prepared by applying a liquid composition of polyvinyl butyral and phosphorus pentoxide in a reaction solution of glacial acetic acid, tetrachlorosilane, and ethyl alcohol onto the electrode base plates by spin coating and, after drying, heating the plates at 350° C.

Then, similarly as in Example 1, display devices were fabricated with these electro-optical cells, whereupon it was found that these cells exhibited excellent characteristics and reliability similarly as in Example 1.

Further, when a liquid composition of polyvinyl acetal and phosphorus pentoxide in a reaction solution of propionic acid, monomethyltrichlorosilane and methyl alcohol was used instead of the above mentioned composition, the resultant electro-optical cells also exhibited excellent characteristics.

COMPARISON EXAMPLE 1

A pair of electrode base plates each composed of a glass plate and an electroconductive film of indium oxide on one side of the glass plate were etched with specific patterns and then washed by an ordinary method thereby to produce a pair of electrode base plates. These plates were then coated by immersion in a 0.5-percent aqueous solution of polyoxyethylene nonylphenyl ether as an orientation agent and thereafter dried by heating in vacuum.

Then the surface of each plate coated as described above was rubbed with a cloth in one direction and thus orientated. The orientation of this film could not withstand a temperature of even 250° C, and, as a result, these electrode base plates could not be sealed with an inorganic sealing agent without destroying the orientation. Therefore, a nylon film of a thickness of 20 microns was interposed between the pair of electrode base plates, and these plates were bonded with their respective orientation directions perpendicular to each other by heat-pressure bonding at 110° C.

Thereafter, into the space between the pair of plates through a previously provided pouring port, a mixture liquid crystal material composed of 50 parts of p-methoxybenzylidene-p'-n-butylaniline, 50 parts of p-ethoxybenzylidene-p'-n-butylaniline and 5 parts of p-n-propylbenzylidene-p'-cyanoaniline was introduced, and the pouring port of the pair of plates was sealed with an epoxy resin. Thus, an electro-optical cell was fabricated. In addition, similarly as in Example 1, a display device was fabricated with the cell.

When the device was left for 24 hours under a temperature of 50° C and a high relative humidity of 90%, the orientation was completely destroyed and the consumption of electric current amounted to 4 times that before the exposure to the above stated temperature and humidity.

COMPARISON EXAMPLE 2

Similarly as in Example 5, a pair of electrode base plates were prepared. Then, the same ink composition as described in Example 5 was directly printed on the sealing parts of the electrode base plates without the medium of the electrode protecting layer by a silk-screen printing method. Then, the electrode base plates were heated at a temperature of 300° to 500° C to remove the organic materials from the applied ink composition thereby to bake the glass frit onto the sealing parts of the electrode base plates. In this case, the electrodes were broken by the sealing agent and, thus, the application of an electric field to a liquid crystal become impossible.

COMPARISON EXAMPLE 3

Pieces of glass for electrode base plates with electroconductive films of indium oxide deposited by evaporation on their surfaces on one side were etched with specific patterns and then washed by an ordinary method thereby to produce a pair of electrode base plates.

Then, a 5% solution in dimethylacetamide of a polyamic acid which is a precursor of a polyimide, and which was obtained by polyaddition of pyromellitic anhydride and 4,4'-diaminodiphenyl ether, was applied onto the electrode base plates by spin coating. After this coating, these electrode base plates were heat treated at 250° C for 30 minutes and caused to undergo dehydration and ring closure, and a polyimide film was thus formed on each electrode base plates. Thereafter, the same ink composition as described in Example 5 was directly printed on the sealing parts of the electrode base plates without the medium of an inorganic material layer for protecting the electrode by a silk-screen printing method. Then, the electrode base plates were dried by heating them to a temperature of 150° C for 10 minutes.

Then, each of these electrode base plates thus treated was orientated by rubbing in one direction with a cloth. The pair of these plates so treated were bonded with their surfaces coated with the polyimide film on the inner sides and facing each other and with their respective orientated directions at right angles to each other by heat-pressure bonding at 420° for 10 minutes. Thereafter, an electro-optical cell was fabricated in the same manner as described in Example 5.

As a result, it was found that although the electro-optical cell exhibited good visibility angle and contrast, it was inferior in heat resistance and strength because of the absence of an electrode protecting layer. Also, when the cell was subjected to a heat impact test at a temperature of 0° to 80° C, cracks occurred at the sealing parts.

I claim:

1. An electro-optical cell for field-effect type liquid crystal display comprising:
   a pair of electrode base plates each comprising a transparent base plate and an electrode film adhering to one surface thereof;
   a pair of inorganic-protecting layers respectively provided in direct contact with at least the peripheral portion of the surface of each of said electrode base plates having the electrode films thereon;
   an inorganic sealing agent applied at the peripheral portions of the electrode base plates in direct contact with the respective inorganic protecting layers so as to seal said base plates together with said electrode films facing each other to form a cell containing therein a nematic liquid crystal material having a positive dielectric anisotropy, and the cell being placed on an optical path so that the light passes through the pair of electrode base plates; and
   a pair of polyimide resin films respectively oriented in one direction and provided within the cell over each of the electrode films in direct contact with the nematic liquid crystal material such that the directions of the orientations of the polyimide resin films intersect each other as viewed along the optical path.

2. The electro-optical cell according to claim 1 wherein said pair of inorganic electrode-protecting layers are respectively provided entirely on the surface having the electrode film of each of said electrode base plates and said pair of polyimide resin films are respectively provided on each of the inorganic electrode-protecting layers.

3. The electro-optical cell according to claim 1 wherein the inorganic electrode-protecting layer is made of a vitreous material selected from the group consisting of silicon dioxide, silicon monoxide, magnesium fluoride, aluminum oxide, lithium-silicon double oxide, and mixed oxides thereof.

4. The electro-optical cell according to claim 1 wherein the inorganic electrode-protecting layer is made of a vitreous material prepared by drying and heating a siliceous composition comprising a solution of a silicon compound, a vitrifiable compound, and an organic film-forming compound.

5. The electro-optical cell according to claim 1 wherein the thickness of the electrode-protecting layer is from 0.005 to 10 microns.

6. The electro-optical cell according to claim 1 wherein said inorganic sealing agent is a glass frit capable of being heat-sealed at a temperature not greater than 500° C.

7. The electro-optical cell according to claim 1 wherein said polyimide resin is made of a member selected from the group consisting of a polyimide prepared by subjecting to dehydration and ring closure a polyamic acid formed by polyaddition of a carboxylic acid dianhydride and a diamine, a polyamide-imide prepared by subjecting to dehydration and ring closure a polyamic acid formed by polyaddition of a carboxylic acid dianhydride and a diamine having an imide bond, and a polyester-imide prepared by subjecting to dehydration and ring closure a polyamic acid formed by polyaddition of a diamine and a dicarboxylic acid dianhydride having an ester group.

8. The electro-optical cell according to claim 7 wherein said polyimide resin is made of a polyimide prepared by subjecting to dehydration and ring closure a polyamic acid formed by polyaddition of an aromatic carboxylic acid dianhydride and an aromatic diamine.

9. The electro-optical cell according to claim 1 wherein the thickness of the polyimide resin film is from 0.01 to 10 microns.

10. The electro-optical cell according to claim 1 further comprising a liquid crystal material pouring port sealed with a low temperature sealing agent at a part of the cell including the electrode base plates and the inorganic sealing agent.

11. The electro-optical cell according to claim 10 wherein said low temperature sealing agent is selected from the group consisting of low melting point metals, low melting point inorganic compounds and organic materials including expoxy resins, polyamide resins, polyurethane resins, acrylic resins, α-polyolefin resins, polyester resins, and waxes.

12. The electro-optical cell according to claim 1 wherein said inorganic protecting layers cover said electrode films such that said inorganic-protecting layers interpose between said electrode films and said polyimide resin films.

13. A process for preparing an electro-optical cell for field-effect type liquid crystal display comprising the steps of:

a. providing a pair of electrode base plates each comprising a transparent base plate and an electrode film adhering to one surface thereof, b. providing an inorganic electrode-protecting layer in direct contact with at least the peripheral portion of the surface having the electrode film of each electrode base plate, c. providing a pair of polyimide resin films respectively on the portion surrounded by the peripheral portion of the surface having the electrode film of each electrode base plate over the electrode film, d. orienting the polyimide resin films respectively in one direction, e. assembling said pair of electrode base plates by means of an inorganic sealing-agent applied at the peripheral portion of the electrode base plates in direct contact with respective electrode protecting layer so that the polyimide resin films on the electrode base plates face each other, and the oriented directions thereof intersect each other, thereby forming a cell, f. providing a liquid crystal material pouring port to a part of the cell prior to or during the steps (a) through (d), g. pouring a nematic liquid crystal material having a positive dielectric anisotropy into the cell through the liquid crystal material pouring port, said nematic liquid crystal material being in direct contact with the polyimide resin films and h. sealing the pouring port with a low temperature sealing agent.

14. The process according to claim 13 wherein said step (b) comprises coating the electrode base plate with a vitrifiable coating composition, and drying and heating the coating.

15. The process according to claim 13 wherein said step (b) comprises depositing a vitreous inorganic material on the electrode base plate by evaporation.

16. The process according to claim 13 wherein said step (e) comprises applying an inorganic sealing agent to at least one of the pair of electrode base plates at the peripheral portion thereof on the inorganic electrode-protecting layer, and disposing the pair of electrode base plates with the inorganic sealing agent therebetween and subjecting the thus disposed pair of electrode base plates to heat and pressure.

* * * * *